Feb. 18, 1930. A. W. KATH 1,747,636
INTERNAL COMBUSTION ENGINE
Filed Feb. 6, 1928     2 Sheets-Sheet 2
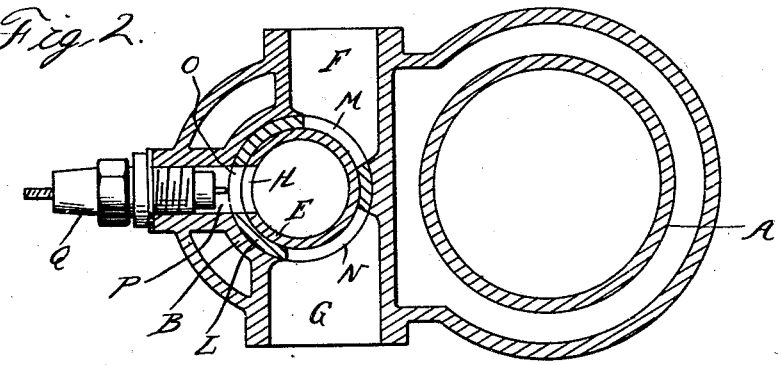
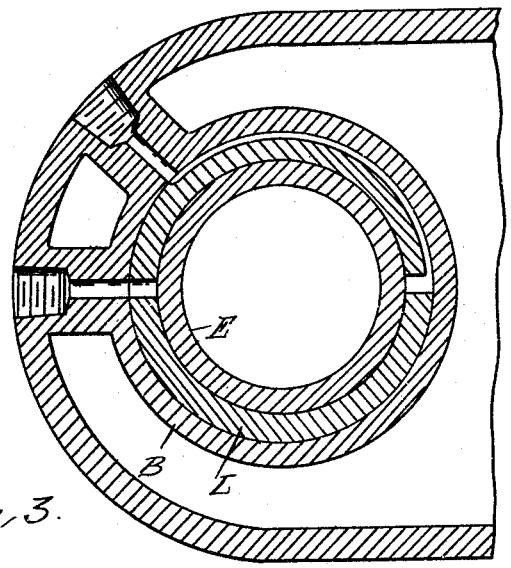
Inventor
Alfred W. Kath Patented Feb. 18, 1930

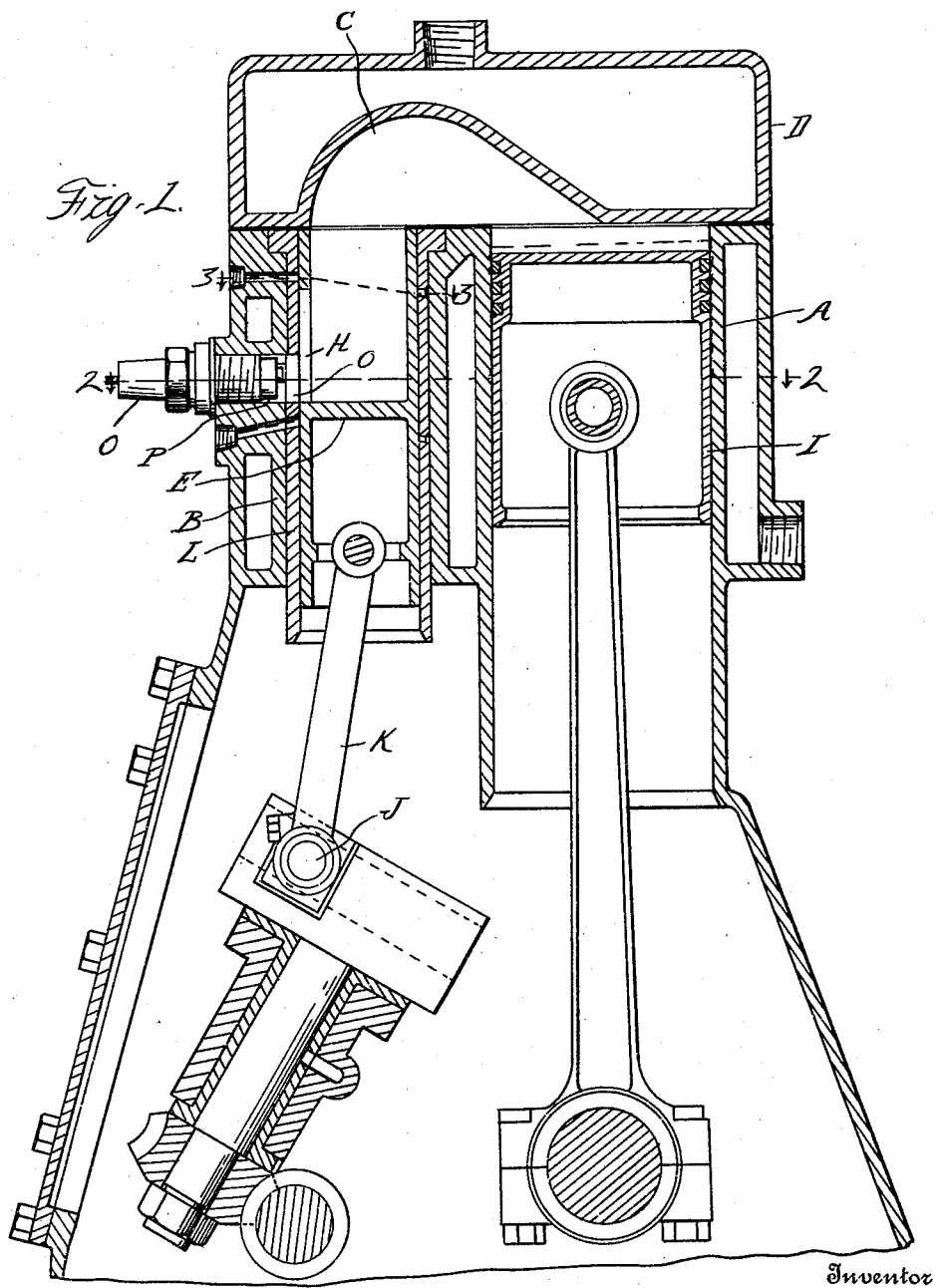

1,747,636

UNITED STATES PATENT OFFICE

ALFRED W. KATH, OF DETROIT, MICHIGAN

INTERNAL-COMBUSTION ENGINE

Application filed February 6, 1928. Serial No. 252,245.

The invention relates to internal combustion engines of that type in which the clearance space for receiving the compressed combustible charge is largely external to the cylinder.

It is the object of the invention to provide means for controlling the introduction and exhaustion of gases from this clearance space and also to control the ignition of the combustible charge so that the flame propagation will be directed from the outermost portion of the chamber toward the cylinder. With these objects in view the invention consists in the construction as hereinafter set forth.

In the drawings;

Figure 1 is a vertical section through the cylinder and external combustion chamber of the engine also showing the controlling valve and operating mechanism therefor.

Figure 2 is a horizontal section on line 2—2 of Figure 1.

Figure 3 is a section on line 3—3 of Figure 1.

A is the engine cylinder which is provided preferably integral therewith with a parallelly arranged cylinder B connected thereto by a channel C in the head D. The cylinder B is adapted to receive a rotary and reciprocating hollow valve member E which latter in conjunction with the passage C forms the clearance space and combustion chamber for the engine.

The inlet and exhaust passages F and G are arranged on opposite sides of the cylinder B and are controlled by a single port F in the valve E. This valve is operated in timed relation to the piston I in the cylinder A through the medium of an obliquely inclined crank shaft J and connecting rod K. The specific construction of this operating mechanism forms no part of the present invention but is such as to impart to the valve a properly timed rotation for registering the port H alternately with ports of the passages F and G and also imparting to the valve a longitudinally oscillation which distributes the lubricant over its surface. Preferably the cylinder B is provided with a bushing L in which the ports M and N are formed connecting respectively to the passages F and G and also having a port O connecting with the pocket P in which the spark plug Q is located. This port O and pocket P are arranged at the lower end of the chamber within the valve E and is also located so that at the time of ignition the port H of the valve E will register with the port O. This permits of igniting the combustible charge at the outermost point of the combustion chamber so that the direction of flame propagation will be from this point inward toward the cylinder.

What I claim as my invention is:

1. In an internal combustion engine, the combination with a power cylinder, of an open ended valve cylinder, a hollow open ended valve in said cylinder in constant communication with the said power cylinder and constituting a compression chamber therefor, and means for igniting the compressed charge at a point within said hollow valve remote from said power cylinder.

2. In an internal combustion engine, the combination with a power cylinder, of an open ended valve cylinder in constant communication with said power cylinder, said valve cylinder being provided with ports on opposite sides thereof for connecting respectively with the inlet and exhaust passages a sleeve valve in said valve cylinder having a single port for alternately registering with said inlet and exhaust ports and constituting a compression chamber when said valve port is out of registration with said inlet and exhaust ports, and ignition means in a pocket in said valve cylinder located to be in registration with the single port of said valve at the time of ignition.

3. In an internal combustion engine, the combination with a power cylinder, of a valve cylinder in constant communication with said power cylinder and provided with inlet and exhaust ports, a hollow valve in said valve cylinder having a single port for alternate registration with said inlet and exhaust ports, the chamber within said valve constituting a compression chamber when the port thereof is out of registration with said inlet and exhaust ports, ignition means located in a pocket adjacent to said valve cylinder at a point farthest removed from said power cylinder and in communication through said single valve port with the compression chamber at the time of ignition.

4. In an internal combustion engine, the combination with a power cylinder, of a cylindrical valve chamber arranged parallel to said power cylinder and having one end in constant communication therewith said valve chamber being provided with oppositely arranged inlet and exhaust ports, a hollow valve in said valve chamber having a single port alternately registering with said inlet and exhaust ports and constituting a compression chamber when out of registration with said ports, ignition means located in the pocket adjacent to said valve chamber and at a point farthest remote from said power cylinder and means for rotating said valve timed to open ignition between said pocket and the compression chamber through said single port at the time for ignition.

5. In an internal combustion engine, the combination with a power cylinder and a cylindrical valve chamber arranged parallel thereto and provided with inlet and exhaust ports on opposite sides thereof, a head for said cylinder having a passage formed therein providing constant communication between said power cylinder and valve cylinder for a rotary valve in said valve cylinder having a single port for alternately registering with said inlet and exhaust ports and constituting when out of registration with said ports a compression chamber, a pocket in said valve cylinder adjacent to a point farthest remote from said power cylinder so located as to be in registration with said single port at the time of ignition, and ignition means located in said pocket.

In testimony whereof I affix my signature.

ALFRED W. KATH.